United States Patent
Nge et al.

(10) Patent No.: US 9,755,449 B2
(45) Date of Patent: Sep. 5, 2017

(54) CONTROLLING POWER IN A MULTI-PORT USB POWER DELIVERY SYSTEM

(71) Applicant: Intel Corporation, Santa Clara, CA (US)

(72) Inventors: Chee Lim Nge, Hillsboro, OR (US); Alexander B. Uan-Zo-Li, Hillsboro, OR (US); Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/495,930

(22) Filed: Sep. 25, 2014

(65) Prior Publication Data

US 2016/0094071 A1    Mar. 31, 2016

(51) Int. Cl.
*H02J 7/00* (2006.01)
*G06F 13/40* (2006.01)

(52) U.S. Cl.
CPC ........ *H02J 7/0052* (2013.01); *G06F 13/4022* (2013.01); *H02J 2007/0059* (2013.01); *H02J 2007/0062* (2013.01); *H02J 2007/0096* (2013.01)

(58) Field of Classification Search
CPC .................. H02J 7/0055; H02J 7/0054; H02J 2007/0001; H02J 7/0003; H02J 7/0004; H02J 7/0009; H02J 7/0013; H02J 2007/0059; H02J 2007/0062; H02J 2007/0096; H02J 2007/009; G01F 13/42; G01F 13/4204
USPC ............................. 320/103, 138, 116; 307/44
See application file for complete search history.

(56) References Cited

U.S. PATENT DOCUMENTS

| | | |
|---|---|---|
| 4,233,553 A | 11/1980 | Prince, Jr. et al. |
| 5,442,274 A | 8/1995 | Tamai |
| 5,872,444 A | 2/1999 | Nagano et al. |
| 6,087,810 A | 7/2000 | Yoshida |
| 6,344,733 B1 | 2/2002 | Crass et al. |
| 6,894,461 B1 | 5/2005 | Hack et al. |
| 7,348,767 B2 | 3/2008 | Hack et al. |
| 7,508,162 B2 | 3/2009 | Lippojoki et al. |

(Continued)

FOREIGN PATENT DOCUMENTS

| | | |
|---|---|---|
| CN | 202127260 U | 1/2012 |
| CN | 102577018 A | 7/2012 |
| CN | 103036274 B | 4/2013 |

OTHER PUBLICATIONS

Leung et al., "Bi-directional Charger", U.S. Appl. No. 14/040,278, filed Sep. 27, 2013, 33 pages.

(Continued)

*Primary Examiner* — Richard Isla Rodas
*Assistant Examiner* — Michael Dibenedetto
(74) *Attorney, Agent, or Firm* — Jordan IP Law, LLC

(57) ABSTRACT

Systems and methods may provide for a charger that includes a converter with a battery port, a first bypass switch coupled to a first bus port and the battery port, and a second bypass switch coupled to a second bus port and the battery port. Additionally, a charge controller may use one or more control signals to manage power to be delivered from the first bus port through the first bypass switch to the battery port, and power to be delivered from the second bus port through the second bypass switch to the battery port.

24 Claims, 2 Drawing Sheets

(56) References Cited

U.S. PATENT DOCUMENTS

| | | | |
|---|---|---|---|
| 7,538,532 B2 | 5/2009 | Hack et al. | |
| 7,863,856 B2 | 1/2011 | Sherman et al. | |
| 7,932,633 B2 | 4/2011 | King et al. | |
| 8,159,181 B2 | 4/2012 | Greyling | |
| 8,441,228 B2 | 5/2013 | Brabec | |
| 8,866,438 B2 | 10/2014 | Lee et al. | |
| 9,024,573 B2 | 5/2015 | King et al. | |
| 9,030,171 B2 | 5/2015 | Wu | |
| 9,102,241 B2 | 8/2015 | Brabec | |
| 9,199,543 B2 | 12/2015 | Brabec | |
| 9,246,348 B2 | 1/2016 | Soile | |
| 2005/0194942 A1 | 9/2005 | Hack et al. | |
| 2005/0253560 A1* | 11/2005 | Popescu-Stanesti | H02J 1/08 320/138 |
| 2007/0236975 A1 | 10/2007 | Lippojoki et al. | |
| 2008/0164853 A1 | 7/2008 | Hack et al. | |
| 2009/0115374 A1* | 5/2009 | Noda | H01M 10/44 320/138 |
| 2009/0179612 A1 | 7/2009 | Sherman et al. | |
| 2010/0033018 A1* | 2/2010 | Fukasawa | H02J 7/0036 307/80 |
| 2010/0096926 A1 | 4/2010 | King et al. | |
| 2010/0109602 A1* | 5/2010 | Chang | H02J 7/0054 320/103 |
| 2010/0125383 A1 | 5/2010 | Caouette | |
| 2010/0231173 A1 | 9/2010 | Andrea et al. | |
| 2011/0025124 A1 | 2/2011 | Brabec | |
| 2011/0169449 A1 | 7/2011 | King et al. | |
| 2012/0091968 A1* | 4/2012 | Heo | H02J 7/35 320/138 |
| 2013/0038127 A1 | 2/2013 | King et al. | |
| 2013/0038273 A1 | 2/2013 | Riggio et al. | |
| 2013/0038288 A1 | 2/2013 | Yeh | |
| 2013/0088203 A1 | 4/2013 | Solie | |
| 2013/0307478 A1 | 11/2013 | Boggs et al. | |
| 2014/0152234 A1* | 6/2014 | Herrmann | H02J 7/007 320/107 |
| 2014/0159650 A1* | 6/2014 | Beauregard | H02J 7/0024 320/107 |
| 2014/0266011 A1* | 9/2014 | Mehta | H02J 7/0042 320/107 |
| 2014/0292278 A1 | 10/2014 | Wu | |
| 2015/0084577 A1 | 3/2015 | Schuessler | |
| 2015/0091497 A1 | 4/2015 | Leung et al. | |
| 2016/0087468 A1* | 3/2016 | Walls | H02J 7/0044 320/114 |

OTHER PUBLICATIONS

Office Action for U.S. Appl. No. 14/040,278, dated Aug. 21, 2015, pages.
Office Action for U.S. Appl. No. 14/040,278, dated Feb. 3, 2016, 17 pages.
Office Action for U.S. Appl. No. 14/040,278, dated Aug. 10, 2016, 21 pages.

* cited by examiner

CONTROLLING POWER IN A MULTI-PORT USB POWER DELIVERY SYSTEM

TECHNICAL FIELD

Embodiments generally relate to power delivery. More particularly, embodiments relate to controlling power in multi-port USB (Universal Serial Bus) power delivery systems.

BACKGROUND

Power delivery via USB (Universal Serial Bus, e.g., USB Specification 3.1, Rev. 1.0, Jul. 26, 2013, USB Implementers Forum) connections may involve providing and/or consuming power under various operating conditions. For example, a given USB connector that supports power delivery may be coupled to a charging circuit that is configured to sink (e.g., consume) power from a 12-20V input to quickly charge an internal battery of the device, sink power from a 5V input to allow charging from general purpose USB charger, and supply a 5V output to power a USB peripheral device. Conventional charging circuits may use several converters and power switches in order to support all of these functions. While recent developments in bidirectional converters may have reduced the number of converters supporting only a single USB connector, devices with multiple USB connectors may still use a separate Buck converter to provide the 5V output.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
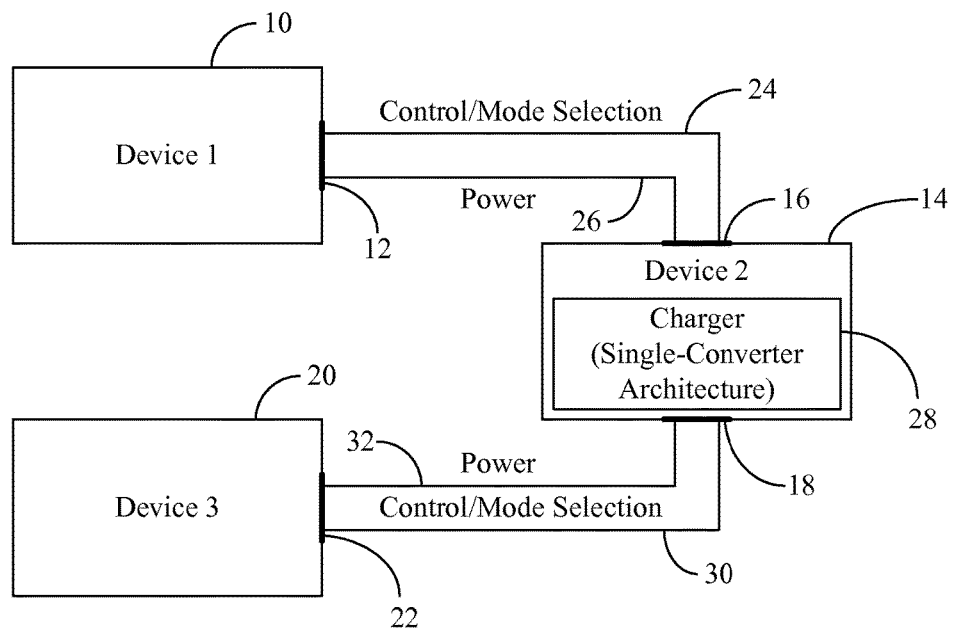
FIG. 1 is a block diagram of an example of a multi-device charging arrangement according to an embodiment.

Turning now to FIG. 1, a multi-device charging arrangement is shown in which a first device 10 includes a bus port 12 that is coupled to a first bus port 16 of a second device 14. Additionally, the illustrated second device 14 includes a second bus port 18 that is coupled to a bus port 22 of a third device 20. The devices 10, 14, 20 may include battery powered devices such as, for example, notebook computers, tablet computers, convertible tablets, mobile Internet devices (MIDs), smart phones, wearable computers, media players, etc., wall powered devices such as, for example, alternating current (AC) adapters, desktop computers, servers, etc., or any combination thereof. Thus, in one example, the first device 10 is an AC adapter, the second device 14 is a notebook computer and the third device 20 is a smart phone. Other device configurations and charging arrangements may also be used.

In the illustrated example, the devices 10, 14, 20, exchange power, control and/or mode selection signals via the bus ports 12, 16, 18, 22. For example, the second device 14 might send a mode signal to the first device 10 over a first connection 24 (e.g., control/mode selection connection), wherein the mode signal indicates that the second device 14 assumes a power consumer status relative to the first device 10. In such a case, the first device 10 may assume a power provider status and supply power to the second device 14 over a second connection 26 (e.g., $V_{BUS}$). The voltage level associated with the power supplied from the first device 10 to the second device 14 may be a fixed default level (e.g., contract voltage, 5V) or variable level (e.g., 5-20V) that is consumer-controlled in real-time by the second device 14.

In the case of the consumer-controlled level, the second device 14 may use the first connection 24 to send one or more control signals to the first device 10, wherein the control signals indicate real-time voltage levels associated with the power to be delivered to the first bus port 16. As will be discussed in greater detail, the second device 14 may include a charger 28 that uses the power received at the first bus port 16 to charge an internal battery (not shown) and/or drive an internal load (e.g., processor, chipset, memory device; not shown). Dynamically controlling the power may enable faster charging of the battery and/or other high performance activities to be conducted by the second device 14. Alternatively, the first device 10 may assume the power consumer status while the second device 14 assumes the power provider status (e.g., supplying either contract or consumer-controlled power). The first connection 24 and the second connection 26 may be combined into a single connection, depending on the circumstances.

Similarly, the second device 14 may send a mode signal to the third device 20 over a third connection 30 (e.g., mode/control selection connection), wherein the mode signal indicates that the second device 14 assumes the power consumer status relative to the third device 20. In such a case, the third device 20 may assume the power provider status and supply power to the second device 14 over a fourth connection 32. The voltage level associated with the power supplied from the third device 20 to the second device 14 may also be a fixed default level or variable level that is consumer-controlled in real-time by the second device 14. Thus, to dynamically control the power, the second device 14 may use the third connection 30 to send one or more control signals to the third device 20, wherein the control signals indicate real-time voltage levels associated with the power to be delivered to the second bus port 18. The charger 28 may therefore also use the power received at the second bus port 18 to quickly charge the internal battery and/or drive internal loads.

Moreover, the charger 28 may use the control signals to balance the power received via the first bus port 16 with the power received via the second bus port 18, as will be discussed in greater detail. Such an approach may reduce the likelihood of overheating along either of the power paths. In one example, the bus ports 12, 16, 18, 22, are USB (Universal Serial Bus) ports that support power delivery (PD). In such a case, the first connection 24 and/or the third connection 30 may include sideband use (SBU) connections, channel configuration (CC) connections, etc., or any combination thereof. Of particular note is that the illustrated charger 28 has a single-converter architecture. The single-converter architecture, which may substantially reduce the cost, complexity, size and/or weight of the second device 14, may be particularly advantageous for small form factor devices.

Figure 2:
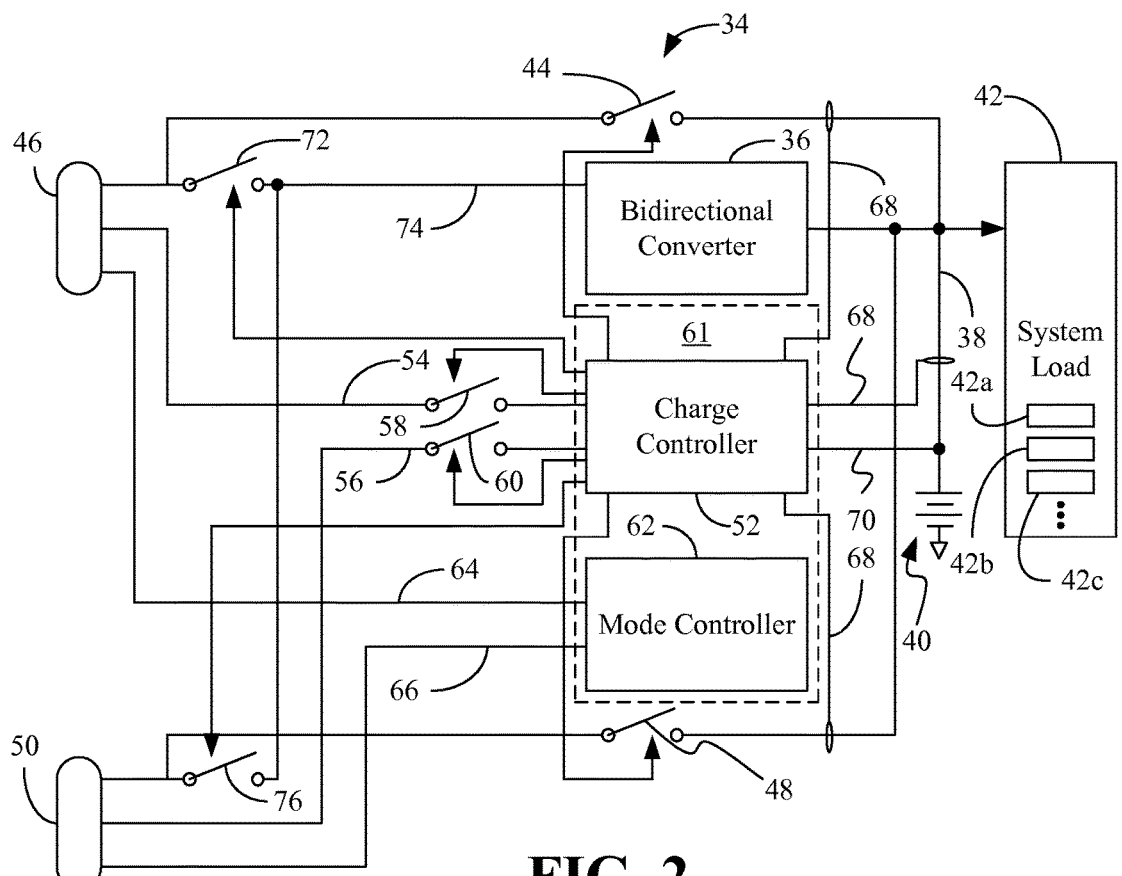
FIG. 2 is a schematic diagram of an example of a charger according to an embodiment.

FIG. 2 shows one example of a single-converter charger architecture 34 that may be readily substituted for the charger 28 (FIG. 1), already discussed. In the illustrated example, the charger architecture 34 includes a bidirectional converter 36 having a battery port 38 connected to a battery 40 and a system load 42 (42a-42c). The system load 42 may include, for example, a processor 42a, a chipset 42b, a memory device 42c, and so forth. The charger architecture 34 may also include a first bypass switch 44 coupled to a first bus port 46 and the battery port 38, and a second bypass switch 48 coupled to a second bus port 50 and the battery port 38. Thus, the first bus port 46 may be similar to the first bus port 16 (FIG. 1) and the second bus port 50 may be similar to the second bus port 18 (FIG. 1), already discussed. In one example, the bus ports 46, 50 are USB Type-C PD ports.

Moreover, it is possible that the control signals and the mode selection signals reside on the same physical wires. Depending on the mode of communication, a single physical wire may contain the consumer control information and the mode selection information. If the control signal is embedded within the mode selection signal wire that is routed to the mode controller, then the mode controller may be the interface that passes the control signal between the charge controller and the port.

The illustrated charger architecture 34 includes a controller 61 having a mode controller 62 and a first configuration line 64 to carry a first mode signal between the first bus port 46 and the mode controller 62, wherein the first mode signal indicates whether the charger architecture 34 assumes the power provider status or the power consumer status relative to a first device coupled to the first bus port 46. Similarly, a second configuration line 66 may carry a second mode signal between the second bus port 50 and the mode controller 62, wherein the second mode signal indicates whether the charger architecture 34 assumes the power provider status or the power consumer status relative to a second device coupled to the second bus port.

The mode controller 62 or a charge controller 52 of the controller 61 may use one or more control signals to manage power to be delivered from the first bus port 46 through the first bypass switch 44 to the battery port 38, and power to be delivered from the second bus port 50 through the second bypass switch 48 to the battery port 38. The illustrated mode controller 62 is aware of the mode in which it is operating, hence the switches may be either directly controlled by the mode controller 62 or indirectly controlled through the charge controller 52. For example, a first communication line 54 may carry a first control signal from the charge controller 52 to the first bus port 46, wherein the first control signal indicates a first real-time voltage level associated with the power to be delivered from the first bus port 46 through the first bypass switch 44 to the battery port 38. Additionally, a second communication line 56 may carry a second control signal from the charge controller 52 to the second bus port 50, wherein the second control signal indicates a second real-time voltage level associated with the power to be delivered from the second bus port 50 through the second bypass switch 48 to the battery port 38.

As already noted, the charge controller 52 may balance the power delivered from the first bus port 46 through the first bypass switch 44 to the battery port 38 with the power delivered from the second bus port 50 through the second bypass switch 48 to the battery port. For example, if the battery 40 may only be charged at 3A, then the charge controller 52 may adjust the control signals so that both the first bus port 46 and the second bus port 50 supply approximately 1.5 A each (e.g., rather than one supplying 2 A and the other supplying 1 A). Such an approach may prevent overheating along any particular path. In one example, switch mode power supplies are used and the control signals are pulse width modulated (PWM) signals capable of controlling the voltage and current output of the power supplies in real-time.

Additionally, the first communication line 54 may include a first enablement switch 58 and the second communication line 56 may include a second enablement switch 60, wherein the charge controller 52 controls the first enablement switch 58 and the second enablement switch 60 based on one or more mode signals. Thus, if the first mode signal indicates that the charger architecture 34 assumes the power consumer status relative to a provider device coupled to the first bus port 46, the charge controller 52 may activate the first enablement switch 58 in order to establish a consumer-control relationship with the provider device coupled to the first bus port 46. Moreover, if the second mode signal indicates that the charger architecture 34 assumes the power consumer status relative to another provider device coupled to the second bus port 50, the mode controller 62 or the charge controller 52 might activate the second enablement switch 60 in order to establish a consumer-control relationship with the provider device coupled to the second bus port 50.

The charger architecture 34 may also include a plurality of current sensors 68 to conduct independent current measurements with respect to the first bypass switch 44, the second bypass switch 48 and the battery port 38. Additionally, a voltage sensor 70 may conduct one or more voltage measurements with respect to the battery port 38, wherein the illustrated charge controller 52 generates the control signals based on the independent current measurements and/or the voltage measurements.

In one example, the charger architecture 34 includes a first contract voltage switch 72 coupled between the first bus port 46 and a contract voltage port 74 of the converter 36. A second contract voltage switch 76 may be coupled between the second bus port 50 and the contract voltage port 74, wherein the charge controller 52 may control the first contract voltage switch 72 and the second contract voltage switch 76 based on the status of the control signals. For example, if consumer-controlled power is not established via the first bus port 46, the charge controller 52 may activate the first contract voltage switch 72 and deactivate the first bypass switch 44 in order to either receive the contract voltage (e.g., in consumer mode) from the first bus port 46 or supply the contract voltage (e.g., in provider mode) to the first bus port 46. Similarly, if consumer-controlled power is not established via the second bus port 50, the charge controller 52 may activate the second contract voltage switch 76 and deactivate the second bypass switch 48 in order to ether receive the contract voltage (e.g., in consumer mode) from the second bus port 50 or supply the contract voltage (e.g., in provider mode) to the second bus port 50.

Figure 3:
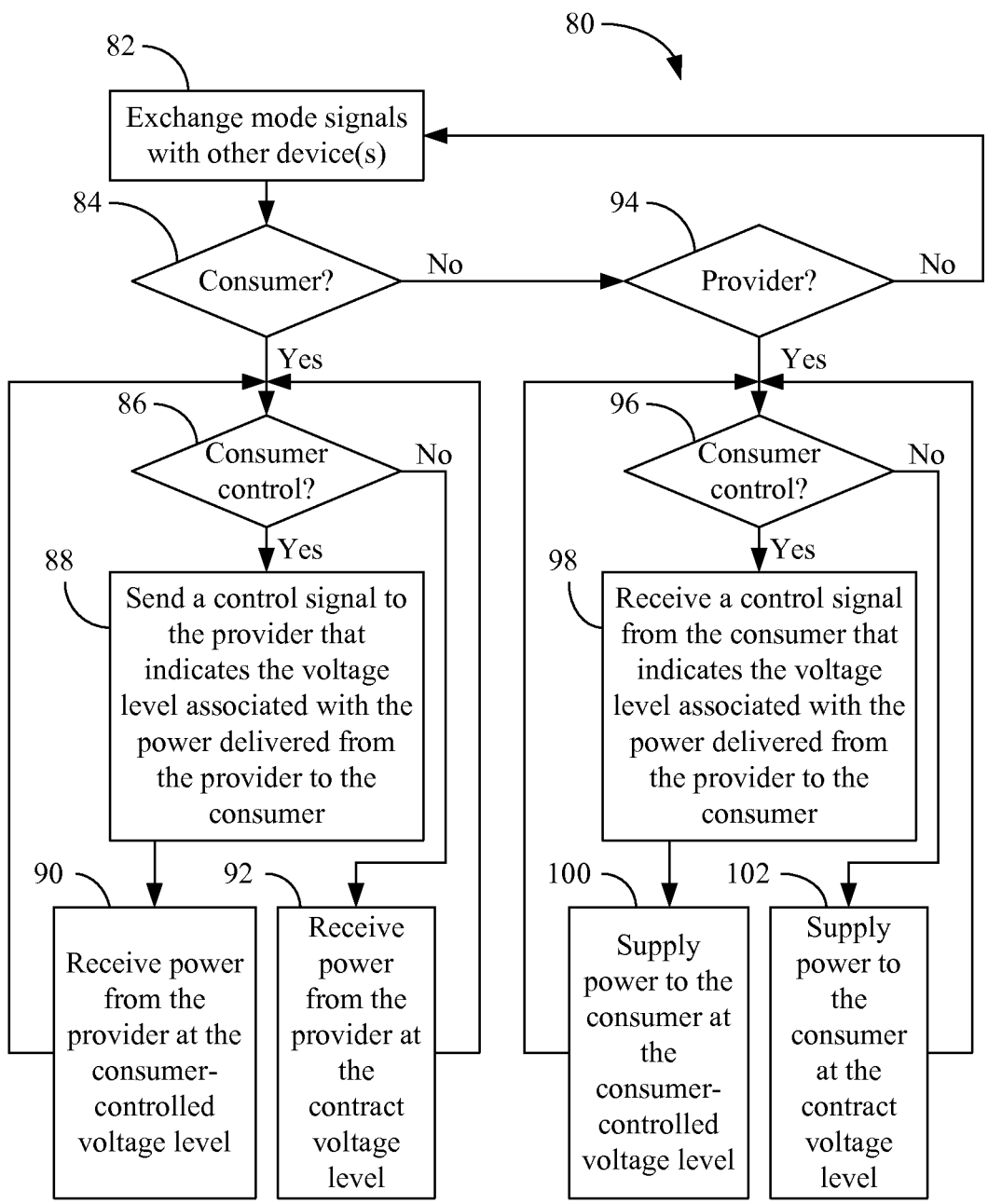
FIG. 3 is a flowchart of an example of a method of operating a charger according to an embodiment.

Turning now to FIG. 3, a method 80 of operating a charger such as, for example, the charger 28 (FIG. 1) and/or the charger architecture 34 (FIG. 2), is shown. The method 80 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

The method 80 may generally be repeated for each of a plurality of bus ports in a device containing the charger.

More particularly, illustrated processing block 82 provides for exchanging mode signals with one or more other devices connected to bus ports of the charger. A determination may be made at block 84 as to whether the charger is assuming the power consumer status with respect to the other device connected to one of the bus ports. If so, the other device assumes the power provider status and illustrated block 86 determines whether consumer-controlled power will be supplied by the provider device to the charger. If the result of block 86 is affirmative, a control signal may be sent to the provider device at block 88, wherein the control signal indicates the real-time voltage level associated with power to be delivered from the provider device to the consumer device containing the charger. Block 88 may also include balancing the power the power delivered from one bus port through a first bypass switch with the power delivered from another bus port through another bypass switch, as already discussed. Illustrated block 90 receives the power from the provider device at the consumer-controlled voltage level and the determination at block 86 may repeat. If it is determined at block 86 that the power supplied by the provider device will not be consumer-controlled, block 92 may provide for receiving the power from the provider device at the contract voltage level (e.g., 5V).

If, on the other hand, it is determined at block 84 that the charger is not assuming the power consumer status with respect to the device connected to one of the bus ports, illustrated block 94 determines whether the charger is assuming the power provider status with respect to the other device connected to one of the bus ports. If so, the other device assumes the power consumer status and illustrated block 96 determines whether consumer-controlled power will be supplied by the charger to the consumer device. If the result of block 96 is affirmative, a control signal may be received by the provider device at block 98, wherein the control signal indicates the real-time voltage level associated with power to be delivered from the charger to the consumer device. Illustrated block 100 supplies the power to the consumer device at the consumer-controlled voltage level and the determination at block 96 may repeat. If it is determined at block 96 that the power supplied by the charger will not be consumer-controlled, block 102 may provide for supplying the power from the charger at the contract voltage level (e.g., 5V).

ADDITIONAL NOTES AND EXAMPLES

Example 1 may include a single-converter charger architecture comprising a converter including a battery port, a first bypass switch coupled to a first bus port and the battery port, a second bypass switch coupled to a second bus port and the battery port, a charge controller, a first communication line to carry a first control signal from the charge controller to the first bus port, wherein the first control signal is to indicate a first real-time voltage level associated with power to be delivered from the first bus port through the first bypass switch to the battery port, a second communication line to carry a second control signal from the charge controller to the second bus port, wherein the second control signal is to indicate a second real-time voltage level associated with power to be delivered from the second bus port through the second bypass switch to the battery port, a plurality of current sensors to conduct independent current measurements with respect to the first bypass switch, the second bypass switch and the battery port, and a voltage sensor to conduct one or more voltage measurements with respect to battery port, wherein the charge controller is to generate the one or more control signals based on one or more of the independent current measurements or the one or more voltage measurements, and use the one or more control signals to manage the power to be delivered from the first bus port through the first bypass switch to the battery port, and the power to be delivered from the second bus port through the second bypass switch to the battery port.

Example 2 may include the single-converter charger architecture of Example 1, wherein the first communication line includes a first enablement switch and the second communication line includes a second enablement switch, and wherein the charge controller is to control the first enablement switch and the second enablement switch based on one or more mode signals.

Example 3 may include the single-converter charger architecture of Example 1, further including a mode controller, a first configuration line to carry a first mode signal between the first bus port and the mode controller, and a second configuration line to carry a second mode signal between the first bus port and the mode controller, wherein the first mode signal is to indicate whether the single-converter charger architecture assumes a power provider status or a power consumer status relative to a first device coupled to the first bus port and the second mode signal is to indicate whether the single-converter charger architecture assumes the power provider status or the power consumer status relative to a second device coupled to the second bus port.

Example 4 may include the single-converter charger architecture of any one of Examples 1 to 3, further including a first contract voltage switch coupled between the first bus port and a contract voltage port of the converter, and a second contract voltage switch coupled between the second bus port and the contract voltage port of the converter, wherein the charge controller is to control the first contract voltage switch and the second contract voltage switch based on a status of one or more of first control signal or the second control signal.

Example 5 may include a multi-port power delivery system, comprising a load including one or more of a processor, a chipset or a memory device, a first bus port, a second bus port, and a charger comprising a converter including a battery port coupled to the load, a first bypass switch coupled to the first bus port and the battery port, a second bypass switch coupled to the second bus port and the battery port, and a charge controller to use one or more control signals to manage power to be delivered from the first bus port through the first bypass switch to the battery port, and power to be delivered from the second bus port through the second bypass switch to the battery port.

Example 6 may include the system of Example 5, wherein the single-converter charger architecture further includes a first communication line to carry a first control signal from the charge controller to the first bus port, wherein the first control signal is to indicate a first real-time voltage level associated with the power to be delivered from the first bus port through the first bypass switch to the battery port, and a second communication line to carry a second control signal from the charge controller to the second bus port, wherein the second control signal is to indicate a second real-time voltage level associated with the power to be delivered from the second bus port through the second bypass switch to the battery port.

Example 7 may include the system of Example 6, wherein the charge controller is to balance the power to be delivered from the first bus port through the first bypass switch to the battery port with the power to be delivered from the second bus port through the second bypass switch to the battery port.

Example 8 may include the system of Example 6, wherein the first communication line includes a first enablement switch and the second communication line includes a second enablement switch, and wherein the charge controller is to control the first enablement switch and the second enablement switch based on one or more mode signals.

Example 9 may include the system of Example 5, wherein the single-converter charger architecture further includes a mode controller a first configuration line to carry a first mode signal between the first bus port and the mode controller, and a second configuration line to carry a second mode signal between the second bus port and the mode controller, wherein the first mode signal is to indicate whether the single-converter charger architecture assumes a power provider status or a power consumer status relative to a first device coupled to the first bus port and the second mode signal is to indicate whether the single-converter charger architecture assumes the power provider status or the power consumer status relative to a second device coupled to the second bus port.

Example 10 may include the system of any one of Examples 5 to 9, wherein the single-converter charger architecture further includes a first contract voltage switch coupled between the first bus port and a contract voltage port of the converter, an a second contract voltage switch coupled between the second bus port and the contract voltage port of the converter, wherein the charge controller is to control the first contract voltage switch and the second contract voltage switch based on a status of the one or more control signals.

Example 11 may include the system of any one of Examples 5 to 9, wherein the single-converter charger architecture further includes a plurality of current sensors to conduct independent current measurements with respect to the first bypass switch, the second bypass switch and the battery port, and a voltage sensor to conduct one or more voltage measurements with respect to the battery port, wherein the charge controller is to generate the one or more control signals based on one or more of the independent current measurements or the one or more voltage measurements.

Example 12 may include a method of operating a charger, comprising using one or more control signals to manage power to be delivered from a first bus port through a first bypass switch to a battery port of a converter, and power to be delivered from the second bus port through the second bypass switch to the battery port.

Example 13 may include the method of Example 12, further including sending, via a first communication line, a first control signal from the charge controller to the first bus port, wherein the first control signal indicates a first real-time voltage level associated with the power to be delivered from the first bus port through the first bypass switch to the battery port, and sending, via a second communication line, a second control signal from the charge controller to the second bus port, wherein the second control signal indicates a second real-time voltage level associated with the power to be delivered from the second bus port through the second bypass switch to the battery port.

Example 14 may include the method of Example 13, further including balancing the power delivered from the first bus port through the first bypass switch to the battery port with the power delivered from the second bus port through the second bypass switch to the battery port.

Example 15 may include the method of Example 13, further including controlling a first enablement switch of the first communication line and a second enable enablement switch of the second communication line based on one or more mode signals.

Example 16 may include the method of Example 12, further including transferring, via a first configuration line, a first mode signal between the first bus port and a mode controller, and transferring, via a second configuration line, a second mode signal between the second bus port and the mode controller, wherein the first mode signal indicates whether the single-converter charger architecture assumes a power provider status or a power consumer status relative to a first device coupled to the first bus port and the second mode signal indicates whether the single-converter charger architecture assumes the power provider status or the power consumer status relative to a second device coupled to the second bus port.

Example 17 may include the method of any one of Examples 12 to 16, further including controlling a first contract voltage switch and a second contract voltage switch based on a status of the one or more control signals, wherein the first contract voltage switch is coupled between the first bus port and a contract voltage port of the converter, and wherein the second contract voltage switch is coupled between the second bus port and the contract voltage port of the converter.

Example 18 may include the method of any one of Examples 12 to 16, further including conducting independent current measurements with respect to the first bypass switch, the second bypass switch and the battery port conducting one or more voltage measurements with respect to the battery port, and generating the one or more control signals based on one or more of the independent current measurements or the one or more voltage measurements.

Example 19 may include a single-converter charger architecture comprising a converter including a battery port, a first bypass switch coupled to a first bus port and the battery port, a second bypass switch coupled to a second bus port and the battery port, and a charge controller to use one or more control signals to manage power to be delivered from the first bus port through the first bypass switch to the battery port, and power to be delivered from the second bus port through the second bypass switch to the battery port.

Example 20 may include the single-converter charger architecture of Example 19, further including a first communication line to carry a first control signal from the charge controller to the first bus port, wherein the first control signal is to indicate a first real-time voltage level associated with the power to be delivered from the first bus port through the first bypass switch to the battery port, and a second communication line to carry a second control signal from the charge controller to the second bus port, wherein the second control signal is to indicate a second real-time voltage level associated with the power to be delivered from the second bus port through the second bypass switch to the battery port.

Example 21 may include the single-converter charger architecture of Example 20, wherein the charge controller is to balance the power delivered from the first bus port through the first bypass switch to the battery port with the power delivered from the second bus port through the second bypass switch to the battery port.

Example 22 may include the single-converter charger architecture of Example 20, wherein the first communication line includes a first enablement switch and the second communication line includes a second enablement switch, and wherein the charge controller is to control the first enablement switch and the second enablement switch based on one or more mode signals.

Example 23 may include the single-converter charger architecture of Example 19, further including a mode controller, a first configuration line to carry a first mode signal between the first bus port and the mode controller, and a second configuration line to carry a second mode signal between the first bus port and the mode controller, wherein the first mode signal is to indicate whether the single-converter charger architecture assumes a power provider status or a power consumer status relative to a first device coupled to the first bus port and the second mode signal is to indicate whether the single-converter charger architecture assumes the power provider status or the power consumer status relative to a second device coupled to the second bus port.

Example 24 may include the single-converter charger architecture of any one of Examples 19 to 23, further including a first contract voltage switch coupled between the first bus port and a contract voltage port of the converter, and a second contract voltage switch coupled between the second bus port and the contract voltage port of the converter, wherein the charge controller is to control the first contract voltage switch and the second contract voltage switch based on a status of the one or more control signals.

Example 25 may include the single-converter charger architecture of any one of Examples 19 to 23, further including a plurality of current sensors to conduct independent current measurements with respect to the first bypass switch, the second bypass switch and the battery port, and a voltage sensor to conduct one or more voltage measurements with respect to the battery port, wherein the charge controller is to generate the one or more control signals based on one or more of the independent current measurements or the one or more voltage measurements.

Example 26 may include a single-converter charger architecture comprising means for performing the method of any of Examples 12 to 18 in any combination or sub-combination thereof.

Thus, techniques may enable more than one provider to charge a system simultaneously. Moreover, the balancing of power may be controlled separately through dedicated control signals. Additionally, system cost, complexity, size and/or weight may be reduced through the use of a single-converter charger architecture.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A charger comprising:
a bi-directional converter including a battery port;
a first bypass switch coupled to a first bus port and the battery port;
a second bypass switch coupled to a second bus port and the battery port;
a first contract voltage switch coupled between the first bus port and a contract voltage port of the converter;
a second contract voltage switch coupled between the second bus port and the contract voltage port of the converter;
a charge controller;
a first communication line to carry a first control signal from the charge controller to the first bus port, wherein the first control signal is to indicate a first real-time voltage level associated with power to be delivered from the first bus port through the first bypass switch to the battery port;
a second communication line to carry a second control signal from the charge controller to the second bus port, wherein the second control signal is to indicate a second real-time voltage level associated with power to be delivered from the second bus port through the second bypass switch to the battery port;

a plurality of current sensors to conduct independent current measurements with respect to the first bypass switch, the second bypass switch and the battery port; and a voltage sensor to conduct one or more voltage measurements with respect to the battery port, wherein the charge controller is to generate the one or more control signals based on one or more of the independent current measurements or the one or more voltage measurements, and use the one or more control signals to manage the power to be delivered from the first bus port through the first bypass switch to the battery port, and the power to be delivered from the second bus port through the second bypass switch to the battery port, wherein the first communication line includes a first enablement switch and the second communication line includes a second enablement switch.

2. The charger of claim 1, wherein the charge controller is to control the first enablement switch and the second enablement switch based on one or more mode signals.

3. The charger of claim 1, further including:
a mode controller;
a first configuration line to carry a first mode signal between the first bus port and the mode controller; and
a second configuration line to carry a second mode signal between the first bus port and the mode controller, wherein the first mode signal is to indicate whether the charger assumes a power provider status or a power consumer status relative to a first device coupled to the first bus port and the second mode signal is to indicate whether the charger assumes the power provider status or the power consumer status relative to a second device coupled to the second bus port.

4. The charger of claim 1, further including:
a first contract voltage switch coupled between the first bus port and a contract voltage port of the converter; and
a second contract voltage switch coupled between the second bus port and the contract voltage port of the converter, wherein the charge controller is to control the first contract voltage switch and the second contract voltage switch based on a status of one or more of first control signal or the second control signal.

5. A system comprising:
a load including one or more of a processor, a chipset or a memory device;
a first bus port;
a second bus port; and
a charger comprising:
a bi-directional converter including a battery port coupled to the load,
a first bypass switch coupled to a first bus port and the battery port,
a second bypass switch coupled to a second bus port and the battery port,
a first contract voltage switch coupled between the first bus port and a contract voltage port of the converter;
a second contract voltage switch coupled between the second bus port and the contract voltage port of the converter;
a first communication line;
a second communication line, and
a charge controller to use one or more control signals to manage power to be delivered from the first bus port through the first bypass switch to the battery port, and power to be delivered from the second bus port through the second bypass switch to the battery port, wherein the first communication line includes a first enablement switch and the second communication line includes a second enablement switch.

6. The system of claim 5, wherein:
the first communication line is to carry a first control signal from the charge controller to the first bus port, wherein the first control signal is to indicate a first real-time voltage level associated with the power to be delivered from the first bus port through the first bypass switch to the battery port; and
the second communication line is to carry a second control signal from the charge controller to the second bus port, wherein the second control signal is to indicate a second real-time voltage level associated with the power to be delivered from the second bus port through the second bypass switch to the battery port.

7. The system of claim 6, wherein the charge controller is to balance the power to be delivered from the first bus port through the first bypass switch to the battery port with the power to be delivered from the second bus port through the second bypass switch to the battery port.

8. The system of claim 6, wherein the charge controller is to control the first enablement switch and the second enablement switch based on one or more mode signals.

9. The system of claim 5, wherein the charger further includes:
a mode controller,
a first configuration line to carry a first mode signal between the first bus port and the mode controller, and
a second configuration line to carry a second mode signal between the second bus port and the mode controller, wherein the first mode signal is to indicate whether the charger assumes a power provider status or a power consumer status relative to a first device coupled to the first bus port and the second mode signal is to indicate whether the charger assumes the power provider status or the power consumer status relative to a second device coupled to the second bus port.

10. The system of claim 5, wherein the charge controller is to control the first contract voltage switch and the second contract voltage switch based on a status of the one or more control signals.

11. The system of claim 5, wherein the charger further includes:
a plurality of current sensors to conduct independent current measurements with respect to the first bypass switch, the second bypass switch and the battery port, and
a voltage sensor to conduct one or more voltage measurements with respect to the battery port, wherein the charge controller is to generate the one or more control signals based on one or more of the independent current measurements or the one or more voltage measurements.

12. A method of operating a charger, comprising:
using one or more control signals to manage power to be delivered from a first bus port through a first bypass switch to a battery port of a bi-directional converter, and power to be delivered from a second bus port through a second bypass switch to the battery port,
sending, via a first communication line, a first control signal from a charge controller to the first bus port, sending, via a second communication line, a second control signal from the charge controller to the second bus port, and controlling a first enablement switch of the first communication line and a second enablement switch of the second communication line based on one or more mode signals;

wherein a first contract voltage switch is coupled between the first bus port and a contract voltage port of the converter, and wherein a second contract voltage switch is coupled between the second bus port and the contract voltage port of the converter.

13. The method of claim 12, wherein the first control signal indicates a first real-time voltage level associated with the power to be delivered from the first bus port through the first bypass switch to the battery port; and wherein the second control signal indicates a second real-time voltage level associated with the power to be delivered from the second bus port through the second bypass switch to the battery port.

14. The method of claim 13, further including balancing the power delivered from the first bus port through the first bypass switch to the battery port with the power delivered from the second bus port through the second bypass switch to the battery port.

15. The method of claim 12, further including:

transferring, via a first configuration line, a first mode signal between the first bus port and a mode controller; and transferring, via a second configuration line, a second mode signal between the second bus port and the mode controller, wherein the first mode signal indicates whether the charger assumes a power provider status or a power consumer status relative to a first device coupled to the first bus port and the second mode signal indicates whether the charger assumes the power provider status or the power consumer status relative to a second device coupled to the second bus port.

16. The method of claim 12, further including controlling the first contract voltage switch and the second contract voltage switch based on a status of the one or more control signals.

17. The method of claim 12, further including:

conducting independent current measurements with respect to the first bypass switch, the second bypass switch and the battery port;

conducting one or more voltage measurements with respect to the battery port; and generating the one or more control signals based on one or more of the independent current measurements or the one or more voltage measurements.

18. A charger comprising:

a bi-directional converter including a battery port;

a first bypass switch coupled to a first bus port and the battery port;

a second bypass switch coupled to a second bus port and the battery port;

a charge controller to use one or more control signals to manage power to be delivered from the first bus port through the first bypass switch to the battery port, and power to be delivered from the second bus port through the second bypass switch to the battery port;

a first communication line to carry a first control signal from the charge controller to the first bus port;

a second communication line to carry a second control signal from the charge controller to the second bus port;

a first contract voltage switch coupled between the first bus port and a contract voltage port of the converter; and a second contract voltage switch coupled between the second bus port and the contract voltage port of the converter, wherein the first communication line includes a first enablement switch and the second communication line includes a second enablement switch.

19. The charger of claim 18, further including:

wherein the first control signal is to indicate a first real-time voltage level associated with the power to be delivered from the first bus port through the first bypass switch to the battery port; and wherein the second control signal is to indicate a second real-time voltage level associated with the power to be delivered from the second bus port through the second bypass switch to the battery port.

20. The charger of claim 19, wherein the charge controller is to balance the power delivered from the first bus port through the first bypass switch to the battery port with the power delivered from the second bus port through the second bypass switch to the battery port.

21. The charger of claim 19, wherein the charge controller is to control the first enablement switch and the second enablement switch based on one or more mode signals.

22. The charger of claim 18, further including:

a mode controller;

a first configuration line to carry a first mode signal between the first bus port and the mode controller; and a second configuration line to carry a second mode signal between the first bus port and the mode controller, wherein the first mode signal is to indicate whether the charger assumes a power provider status or a power consumer status relative to a first device coupled to the first bus port and the second mode signal is to indicate whether the charger assumes the power provider status or the power consumer status relative to a second device coupled to the second bus port.

23. The charger of claim 18, wherein the charge controller is to control the first contract voltage switch and the second contract voltage switch based on a status of the one or more control signals.

24. The charger of claim 18, further including:

a plurality of current sensors to conduct independent current measurements with respect to the first bypass switch, the second bypass switch and the battery port; and a voltage sensor to conduct one or more voltage measurements with respect to the battery port, wherein the charge controller is to generate the one or more control signals based on one or more of the independent current measurements or the one or more voltage measurements.

* * * * *